United States Patent [19]

Merz et al.

[11] Patent Number: 5,273,763
[45] Date of Patent: Dec. 28, 1993

[54] REDUCED CALORIE COATING FOR FROZEN CONFECTIONERY

[75] Inventors: Vernon R. Merz, Hannibal; Gerald J. Rauch, Fulton, both of N.Y.

[73] Assignee: Nestec S.A., Vevey, Switzerland

[21] Appl. No.: 850,395

[22] Filed: Mar. 11, 1992

[51] Int. Cl.$^5$ .............................................. A23G 3/00
[52] U.S. Cl. .................................. 426/101; 426/602; 426/613; 426/302; 426/305; 426/306; 426/548; 426/804
[58] Field of Search ............... 426/101, 100, 601, 602, 426/613, 302, 305, 306, 310, 548, 804

[56] References Cited

U.S. PATENT DOCUMENTS

| | | | |
|---|---|---|---|
| 3,223,532 | 12/1965 | Pinkalla et al. | 426/101 |
| 3,406,081 | 10/1968 | Bauer et al. | 426/306 |
| 4,031,261 | 6/1977 | Durst | 426/601 |
| 4,238,520 | 12/1980 | Miller et al. | 426/573 |
| 4,425,369 | 1/1984 | Sakamoto et al. | 426/613 |
| 4,637,937 | 1/1987 | Terada et al. | 426/602 |
| 4,649,057 | 3/1987 | Thomson | 426/602 |
| 4,762,721 | 8/1988 | Holscher et al. | 426/613 |
| 4,853,236 | 8/1989 | Langler | 426/601 |
| 4,935,251 | 6/1990 | Verhoef et al. | 426/302 |
| 5,017,392 | 5/1991 | Bombardier et al. | 426/306 |
| 5,160,759 | 11/1992 | Nomura et al. | 426/602 |

*Primary Examiner*—Jeanette Hunter
*Attorney, Agent, or Firm*—Vogt & O'Donnell

[57] ABSTRACT

Reduced calorie frozen confectionery products are provided by preparing an oil-in-water emulsion containing 20% to 50% by weight edible vegetable oil, 1% to 10% by weight flavor, an emulsifier, an artificial sweetener and water, deaerating the emulsion, and applying the deaerated emulsion to a frozen confectionery.

28 Claims, No Drawings

REDUCED CALORIE COATING FOR FROZEN CONFECTIONERY

BACKGROUND OF THE INVENTION

The present invention relates to a coating for frozen food products, more particularly to a fat-based coating for frozen confectionery products.

A typical fat-based coating for an ice cream bar contains about 80 calories per bar. Such typical fat-based coatings are made in a similar manner to chocolate and the largest portion of the calories comes from the fat which accounts for approximately 60% of the coating. It would be desirable to reduce the amount of calories in a coated confectionery product by reducing the amount of fat present in the fat-based coating.

SUMMARY OF THE INVENTION

The present invention provides an oil in water emulsion comprising from 20 to 50% by weight based on the weight of the emulsion of an edible vegetable oil, from 1 to 10% by weight of a flavour, an emulsifier and an artificial sweetener, the remainder being water.

The present invention also provides a process for the preparation of an oil-in-water emulsion which comprises mixing from 20% to 50% by weight of an edible vegetable oil, from 1% to 10% by weight of a flavor, an emulsifier, an artificial sweetener and water and then deaerating the mixture.

The present invention also provides a frozen confectionery product coated with an oil-in-water emulsion comprising from 20% to 50% by weight of an edible vegetable oil, from 1% to 10% by weight of a flavor, an emulsifier and an artificial sweetener, the remainder being water.

The present invention further provides a process for coating a frozen confectionery product which comprises applying to the frozen confectionery product an oil-in-water emulsion comprising from 20% to 50% by weight of an edible vegetable oil, from 1% to 10% by weight of a flavor, an emulsifier and an artificial sweetener, the remainder being water.

DETAILED DESCRIPTION OF THE INVENTION

The oil in water emulsion may conveniently contain from 25 to 40% and preferably from 27 to 35% by weight of the edible vegetable oil. The edible vegetable oil may be any oil or fat conventionally used in the trade which produces a snappy texture to the finished coating when applied to a frozen confectionery product, e.g. cocoa butter or a polyunsaturated fat. However it is preferably liquid at ambient temperature and may be soybean oil, coconut oil or cottonseed oil and may advantageously be a mixture of a hydrogenated vegetable oil such as coconut oil and a partially hydrogenated oil such as cottonseed oil (stearine) for instance in a ratio of 100:1 to 50:50.

A variety of possible flavouring agents may be used, e.g., strawberry, fruit puree, vanillin, vanilla or cocoa depending on preference.

A wide range of emulsifiers may be used, for example, microcrystalline cellulose, mono- and di-glycerides, guar gum, lecithin or Xanthan Gum. The amount of emulsifier may be from 0.01 to 1.0% by weight based on the weight of oil in water emulsion.

An example of an artificial sweetener is aspartame. The amount of artificial sweetener may be from 0.01 to 1.0% by weight based on the weight of oil in water emulsion. Sugar may be present, if desired, but it is unnecessary.

The amount of water present in the oil in water emulsion may be from 40 to 75%, preferably from 50 to 70% and especially from 55 to 65% by weight based on the weight of the oil in water emulsion.

The oil in water emulsion is preferably a homogeneous mixture. The process of the invention is advantageously carried out by blending the emulsifier with water, preferably cold water, with agitation, add the flavour and mix thoroughly, preferably warming to from 40° to 60° C., disperse the oil (or melted fat) into the mixture with agitation, homogenise, mix in the sweetener and finally deaerate the mixture. Optionally, the mixture is pasteurised before homogenisation.

The deaeration is preferably carried out under a vacuum, e.g., from 457 mm to 635 mm of mercury at a temperature from 35° to 65° C., preferably from 40° to 55° C. The deaeration is conveniently continued until the mixture has ceased to bubble vigorously, the temperature preferably not falling below 40° to 45° C.

The deaeration reduces the "dry-time", i.e., the time taken for the coating to harden when applied to a frozen dessert.

The frozen confectionery product of the invention may be, for instance, iced milk, custard, mousse, yoghurt or an ice cream bar.

The oil in water emulsion may be applied to the frozen confectionery material by conventional methods such as dipping, spraying or enrobing, for example at a temperature from 28° to 40° C., preferably from 30° to 37° C. and especially from 32° to 35° C. After application to the frozen confectionery material, the oil in water emulsion may set to a sufficient extent by the fall in temperature caused by contact with the frozen confectionery material. The coated product is preferably afterwards refrozen to a temperature conveniently from −30° to −40° C., for example, in a freezing tunnel to complete the setting process, if necessary.

The oil in water emulsion has a reduced fat content and reduced calories when compared with conventional fat-based coatings but still retains its textural "snap".

EXAMPLES

The following Examples further illustrate the present invention. Parts are given by weight.

EXAMPLE 1

0.030 parts of Xanthan Gum was blended into 62.937 parts of cold water and allowed to hydrate for 20 minutes with periodic agitation. The hydrated Xanthan Gum was heated at 49° C. and 5 parts of cocoa flavour (E-11) together with 2 parts of cocoa flavour (F-27) were added and blended in thoroughly. 1 part of partially hydrogenated cottonseed oil (stearine) was melted at 60° C. and then blended with 29 parts of coconut oil. The temperature of the oil blend was adjusted to 55° C. and poured into the mixture of cocoa flavour, Xanthan Gum and water and mildly agitated to disperse the oils. The mixture was then homogenised firstly at 2250 psi (1st stage) and then 250 psi (2nd stage) at 55° C. after which .033 part of aspartame was slurried into the mixture.

The mixture was then deaerated at 45° C. in a vacuum chamber at 550 mm of mercury until bubbling had reached a minimum, the temperature not falling below 40° to 45° C.

The oil in water emulsion obtained had 50% less fat and 43% fewer calories than a conventional fat-based coating.

EXAMPLE 2

An ice cream bar was dipped into the oil in water emulsion prepared in Example 1 at a temperature from 32° to 35° C. to give a coated ice cream bar. The coating hardened within 45 to 60 seconds because the temperature of the coating dropped on contact with the frozen ice cream bar.

EXAMPLE 3

An ice cream bar formed by extrusion through a freezing tunnel was enrobed by the oil in water emulsion prepared in Example 1 and the coated ice cream bar was then immediately passed through a further freezing tunnel to set the coating.

We claim:

1. A process for preparing a deaerated coating composition comprising forming an oil-in-water emulsion containing, based upon the weight of the emulsion, from 20% to 50% by weight edible vegetable oil, from 1% to 10% by weight flavor, an emulsifier, an artificial sweetener and water, and deaerating the formed emulsion.

2. A process according to claim 1 wherein the emulsion contains from 25% to 40% by weight edible vegetable oil.

3. A process according to claim 1 wherein the emulsion is deaerated under vacuum.

4. A process according to claim 3 wherein the emulsion is deaerated at a temperature of from 35° C. to 54° C.

5. A process according to claim 4 wherein the emulsion is deaerated at a temperature of from 40° C. to 55° C.

6. A process according to claim 1 wherein the emulsion is formed by blending the emulsifier and water, adding the flavor to the water-emulsifier blend and mixing, dispersing the oil into the water-emulsifier-flavor mixture, homogenizing the water-emulsifier-flavor-oil mixture, and mixing the sweetener with the homogenized mixture.

7. A process according to claim 6 wherein the emulsifier is blended with cold water, and further comprising heating the water-emulsifier-flavor mixture to a temperature of from 40° C. to 60° C. before dispersing the oil therein.

8. A process according to claim 1 wherein the edible vegetable oil comprises cocoa butter.

9. A process according to claim 1 wherein the edible vegetable oil comprises a member selected form the group consisting of soybean oil, coconut oil and cottonseed oil.

10. A process for preparing a coated frozen confectionery product comprising forming an oil-in-water emulsion containing, based upon the weight of the emulsion, from 20% to 50% by weight edible vegetable oil, from 1% to 10% by weight flavor, an emulsifier, an artificial sweetener and water; deaerating the formed emulsion; and applying the deaerated emulsion to a frozen confectionery.

11. A process according to claim 10 wherein the emulsion contains from 25% to 40% by weight edible vegetable oil.

12. A process according to claim 10 wherein the edible vegetable oil comprises cocoa butter.

13. A process according to claim 10 wherein the edible vegetable oil comprises a member selected form the group consisting of soybean oil, coconut oil and cottonseed oil.

14. A process according to claim 10 wherein the deaerated emulsion has a temperature of from 28° C. to 40° C. when applied to the frozen confectionery.

15. A process according to claim 14 wherein the deaerated emulsion has a temperature of from 32° C. to 35° C. when applied to the frozen confectionery.

16. A process according to claim 10 wherein the deaerated emulsion is applied by spraying.

17. A process according to claim 10 wherein the deaerated emulsion is applied by dipping.

18. A process according to claim 10 wherein the deaerated emulsion is applied by enrobing.

19. A process according to claim 10 further comprising cooling the coated confectionery to a temperature of from −30° C. to 31 40° C.

20. A deaerated oil-in-water emulsion comprising, based upon the weight of the emulsion, from 20% to 50% edible vegetable oil, from 1% to 10% flavor, an emulsifier, an artificial sweetener and water.

21. An emulsion according to claim 20 containing from 25% to 40° edible vegetable oil.

22. An emulsion according to claim 20 wherein the edible vegetable oil comprises cocoa butter.

23. An emulsion according to claim 20 wherein the edible vegetable oil comprises a member selected from the group consisting of soybean oil, coconut oil and cottonseed oil.

24. A frozen confectionery product comprising a frozen confectionery and a coating comprising a deaerated oil-in-water emulsion comprising, by weight of the emulsion, from 20% to 50% edible vegetable oil, from 1% to 10% flavor, an emulsifier, an artificial sweetener and water.

25. A product according to claim 24 wherein the oil-in-water emulsion contains from 25% to 40% edible vegetable oil.

26. A product according to claim 22 wherein the frozen confectionery is a member selected from the group consisting of iced milk, custard, mousse, yogurt and ice cream.

27. A product according to claim 22 wherein the edible vegetable oil comprises cocoa butter.

28. A product according to claim 22 wherein the edible vegetable oil comprises a member selected from the group consisting of soybean oil, coconut oil and cottonseed oil.

* * * * *

UNITED STATES PATENT AND TRADEMARK OFFICE
CERTIFICATE OF CORRECTION

PATENT NO. : 5,273,763

DATED : December 28, 1993

INVENTOR(S) : Vernon R. MERZ, et al.

It is certified that error appears in the above-identified patent and that said Letters Patent is hereby corrected as shown below:

Column 3, line 36 (line 2 of claim 4), "54" should be --65--.

Column 4, line 29 (line 3 of claim 19), delete "31" and "40" should be -- -40 --.

Column 4, line 51 (line 1 of claim 26), "22" should be --24--.

Column 4, line 55 (line 1 of claim 27), "22" should be --24--.

Column 4, line 57 (line 1 of claim 28), "22" should be --24--.

Signed and Sealed this

Third Day of May, 1994

Attest:

BRUCE LEHMAN

*Attesting Officer*  *Commissioner of Patents and Trademarks*